United States Patent [19]
Sakamoto et al.

[11] Patent Number: 5,653,218
[45] Date of Patent: Aug. 5, 1997

[54] ELECTRIC-POWERED STONE CUTTER

[75] Inventors: Siyouiti Sakamoto; Kazumi Takeishi; Takahiko Shimada, all of Katsuta, Japan

[73] Assignee: Hitachi Koki Co., Ltd., Tokyo, Japan

[21] Appl. No.: 331,095

[22] Filed: Oct. 28, 1994

[30] Foreign Application Priority Data

| Oct. 29, 1993 | [JP] | Japan | 5-272450 |
| Jun. 10, 1994 | [JP] | Japan | 6-128958 |

[51] Int. Cl.$^6$ ............................ B28D 1/04
[52] U.S. Cl. .................. 125/13.01; 451/358; 451/453
[58] Field of Search ............ 125/12, 14, 13.01; 451/358, 359, 344, 450, 453, 454

[56] References Cited

U.S. PATENT DOCUMENTS

| 1,480,263 | 1/1924 | Hoffman | 451/358 |
| 1,651,995 | 12/1927 | Casey | 451/358 |
| 2,422,733 | 6/1947 | Jimerson | 451/359 |
| 2,533,924 | 5/1950 | Lillquist | 451/358 |
| 3,896,783 | 7/1975 | Manning | 125/13.01 |
| 4,060,940 | 12/1977 | Dewitt | 451/358 |
| 4,188,935 | 2/1980 | Tubesing | 451/358 |
| 4,434,586 | 3/1984 | Muller et al. | 451/358 |
| 5,466,183 | 11/1995 | Kim et al. | 451/357 |

FOREIGN PATENT DOCUMENTS

| 0898786 | 5/1945 | France | 451/359 |
| 3444116 | 6/1986 | Germany | B24B 27/08 |
| 4105340 | 8/1992 | Germany | B24B 23/02 |
| 60-56 | 1/1985 | Japan | B24B 27/06 |
| 61-71415 | 5/1986 | Japan | B28D 7/02 |
| 62-63060 | 3/1987 | Japan | B24B 27/08 |
| 63-67063 | 5/1988 | Japan | B24B 27/08 |
| 63-67064 | 5/1988 | Japan | B24B 27/08 |
| 538669 | 2/1993 | Japan | B24B 23/00 |
| 61767 | 1/1994 | Japan | B28D 1/04 |

*Primary Examiner*—Robert A. Rose
*Attorney, Agent, or Firm*—Sughrue, Mion, Zinn, Macpeak & Seas

[57] ABSTRACT

A motor is housed in a main body and a transmission gear of a series of three transmission gears is mounted to a motor shaft. The last of the series of transmission gears is mounted on one end of an elongated and distortable connection rod. A first bevel gear is attached to the other end of the connection rod. A second bevel gear, which in engagement with the first bevel gear, is attached to one end of a spindle. The spindle extends in a direction perpendicular to the direction in which the connection rod extends. A wheel shaped bit is attached to the other end of the spindle. Rotation of the motor is transmitted to the bit via the three transmission gears, the connection rod, the two bevel gears, and the spindle. To cut a workpiece, the rotating bit is repeatedly moved back and forth into the surface of the workpiece. A handle is attached to the main body and extends in a plane which contains an axis of the motor shaft. A secondary handle with a grip is attached to the main body so that the grip is positioned to intersect the plane.

20 Claims, 11 Drawing Sheets

ELECTRIC-POWERED STONE CUTTER

BACKGROUND OF THE INVENTION

The present invention relates to a power stone cutter for cutting stone-like materials such as stone, concrete or asphalt using bits such as grinding stones or disk-shaped diamond blades.

A conventional electric-powered stone cutter generally includes an electric motor, a main body for accommodating therein the electric motor, a handle for moving the main body, and a circular bit driven by the motor. One example of such electric-powered stone cutter is described in Japanese Utility Model Application Kokai No. SHO-60-56. In the disclosed device, a support base extends frontwardly from the main body for facilitating support of the entire cutter by positioning a tip end portion of the support base onto a workpiece. A stepped portion is provided in the support base, so that the stepped portion can abut a corner of the workpiece, whereby the entire cutter can be temporarily held at a position.

Another example of the electric-powered stone cutter is described in a Japanese Utility Model Application Kokai No. SHO-61-71415 in which a roller is attached to a front portion of a safety cover which covers the bit for facilitating movement of the cutter over the workpiece.

In the above conventional power stone cutters, the bit is driven into the workpiece a large amount each time the bit is forced into the workpiece. To this effect, the base or the roller is provided for facilitating extension of the bit into the workpiece through the base or roller. In other words, a large infeed amount of the bit can be provided by forcibly placing the stone cutter onto the workpiece by way of the base or the roller and by projecting the bit through the base or roller a large amount. However, to insure that the force of the bit is channeled toward the workpiece, and not consumed in a reactionary movement in the direction away from the workpiece, the operator must expend a great deal of energy pressing the cutter firmly against the workpiece. This puts a large burden on the operator.

To reduce the burden on the operator, the base or roller is omitted from engine-powered stone cutters and the bit is forced into the workpiece only a small amount at a time. The workpiece is cut through by repeatedly passing the stone cutter back and forth across the area of the workpiece to be cut. Since only a small force is required each time the bit is forced into the workpiece, the burden on the operator is reduced. Examples of conventional engine-powered stone cutters are described in Japanese Utility Model Application Kokai Nos. SHO-63-67063 and SHO-63-67064, and a Japanese Patent Application Kokai No. SHO-62-63060.

In the engine-powered stone cutters, a belt is provided for transmitting rotation of the engine to the bit. The belt facilitates increasing or decreasing the RPM of the bit. Fluctuations in the RPM of the bit caused when the belt slips are easily corrected for by increasing or decreasing the RPM of the engine that powers the bit.

However, it is known that there are many problems with engine-powered stone cutters. For example, the gasoline engine is difficult to start at low temperatures. Also, operators risk pseudo-Raynaud's disease (a vibration syndrome occurring in users of engine powered machinery) from the vibration of the engine. Fumes from the gasoline for running the engine have an unpleasant odor. The engine is noisy. Also, the cutter has a relatively large lateral width, the lateral width being in the thickness direction of the bit, due to the power transmission arrangement between an engine output shaft and the belt, i.e., the engine itself has a large lateral width in the reciprocating direction of the piston, and the belt extends in the direction perpendicular to the reciprocating direction, so that resultant lateral width becomes large. Since an operator must hold the handle positioned adjacent to the engine, the operator is distant from the cutting area of the bit. Accordingly, operability of the stone cutter may be degraded, and it may be rather difficult to observe an exact cutting position, so that cutting accurately along an intended cutting line may be degraded.

Japanese Patent Application Kokai No. HEI5-38669 discloses an electric-powered stone cutter whose handle is pivotally movably provided for enhancing operability and holdability. Further, Japanese Utility Model Application Kokoku No. HEI6-1767 discloses an engine-powered stone cutter having a suction hood provided over the bit.

SUMMARY OF THE INVENTION

It is therefore, an object of the present invention to overcome the above described drawbacks and to provide an improved electric-powered stone cutter with enhanced operability.

This and other objects of the present invention will be attained by providing a power stone cutter including an electric motor having a motor shaft which provides an axis, a main body for housing the electric motor, a handle mounted to the main body, and a bit supported by the main body and rotatable by the electric motor for cutting a workpiece. The improvement over conventional stone cutters is provided in an arrangement comprising a plurality of transmission gears, a connection rod, first and second bevel gears, and a spindle. The plurality of transmission gears are provided at right angles to the axis of the motor shaft for transmitting rotation of the electric motor. The connection rod extends in parallel with the motor shaft and has one end coupled with one of the transmission gears and has another end to which the first bevel gear is fixed. The second bevel gear is in meshing engagement with the first bevel gear. The spindle is fixed to the second bevel gear and extends in a direction perpendicular to the motor shaft. The bit is mounted to the spindle. The handle and the bit are in a plane which contains the axis of the motor shaft.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENTS

A power stone cutter according to a first embodiment of the present invention will be described with reference to FIGS. 1 through 4.

Figure 3:
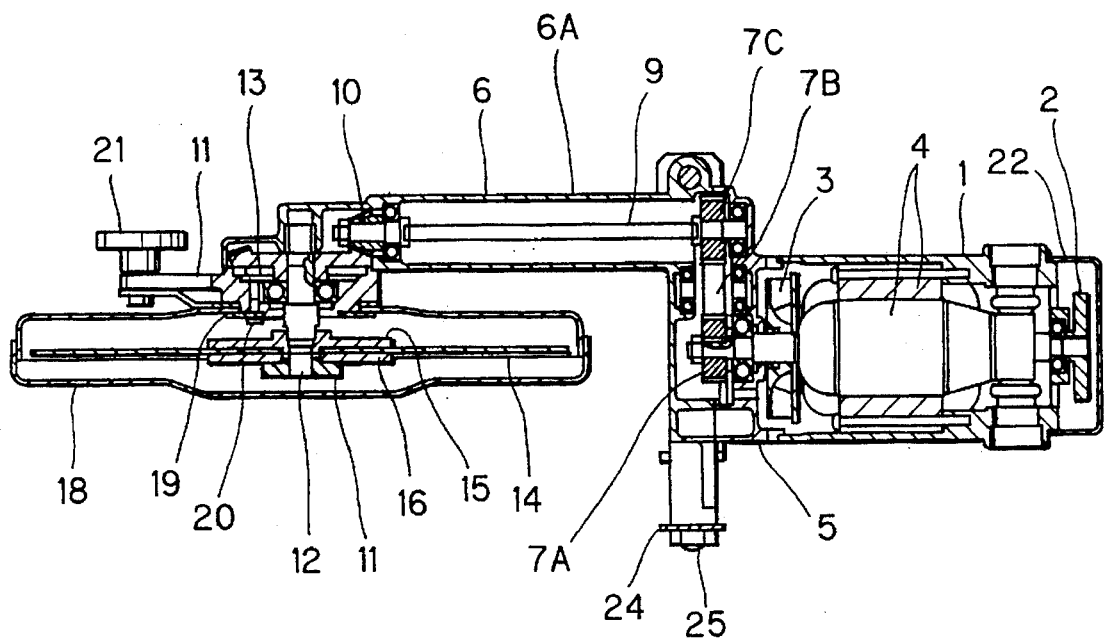
FIG. 3 is a cross-sectional view taken along the line III—III in FIG. 1.

The power stone cutter includes a main body 1 in which an electric motor 4 and a flywheel 2 are disposed. As best shown in FIG. 3, the motor 4 has a drive shaft whose rear end portion is coupled with the flywheel 2 having a size capable of providing a relatively large inertial force. The drive shaft of the motor 4 has a front end portion coupled with a cooling fan 3 for cooling the motor 4. A gear 7A of a gear train is also coupled to the drive shaft of the motor 4.

An inner cover 5 is fixed to the front portion of the main body 1 by a bolt (not shown) to rotatably support the motor shaft and an intermediate gear 7B through ball bearings. The cooling fan 3, the gear 7A and an intermediate gear 7B of the gear train are housed in the inner cover 5. Further, a gear cover 6 with an elongated portion 6A is attached to the inner cover 5 by a bolt (not shown) so that the elongated portion 6A extends away from the main body 1. Further, a bearing holder 11 is mounted below the front end of the elongated portion 6A of the gear cover 6. The gear trains 7A through 7C are provided at right angles to the motor shaft.

A connection rod 9 extends in the elongated portion 6A of the gear cover 6. The connection rod 9 has a rear end portion coupled with a transmission gear 7C of the gear train. Thus, rotation of the electric motor 4 is transmitted to the connection rod 9 by way of the transmission gears 7A through 7C. The connection rod 9 has an intermediate portion having a smaller diameter than that of the end portions for serving as a torsion bar twistable to absorb rapid increases or decreases in load.

The connection rod 9 has a front end portion coupled with a bevel gear 10 also housed in the gear cover 6. A second bevel gear 13 is also housed in the gear cover 6 in engagement with the first bevel gear 10. The second bevel gear 13 is mounted on a spindle 12 rotatably supported by a bearing held by the bearing holder 11. One end portion of the spindle 12 is supported in the gear cover 6 and another end of the spindle 12 is coupled with a bit 14 by washers 15 and 16 and a nut 17. A holder plate 19 is fixed to the bearing holder 11 by a lock screw 20. A bit guard 18 for covering the bit 14 is provided mounted on the holder 19 so as to be rotatable around the bit 14 to an optional position. A set screw 21 is provided on the bearing holder 11. The set screw 21 is engageable with a side wall of the bit guard 18 for fixing the bit guard 18 in an optional position. With this arrangement, a linear arrangement is provided between an axis of the motor shaft and a plane of the bit 14. Incidentally, the expressions "front" and "rear" imply the bit 14 side and flywheel 2 side, respectively.

Figure 1:
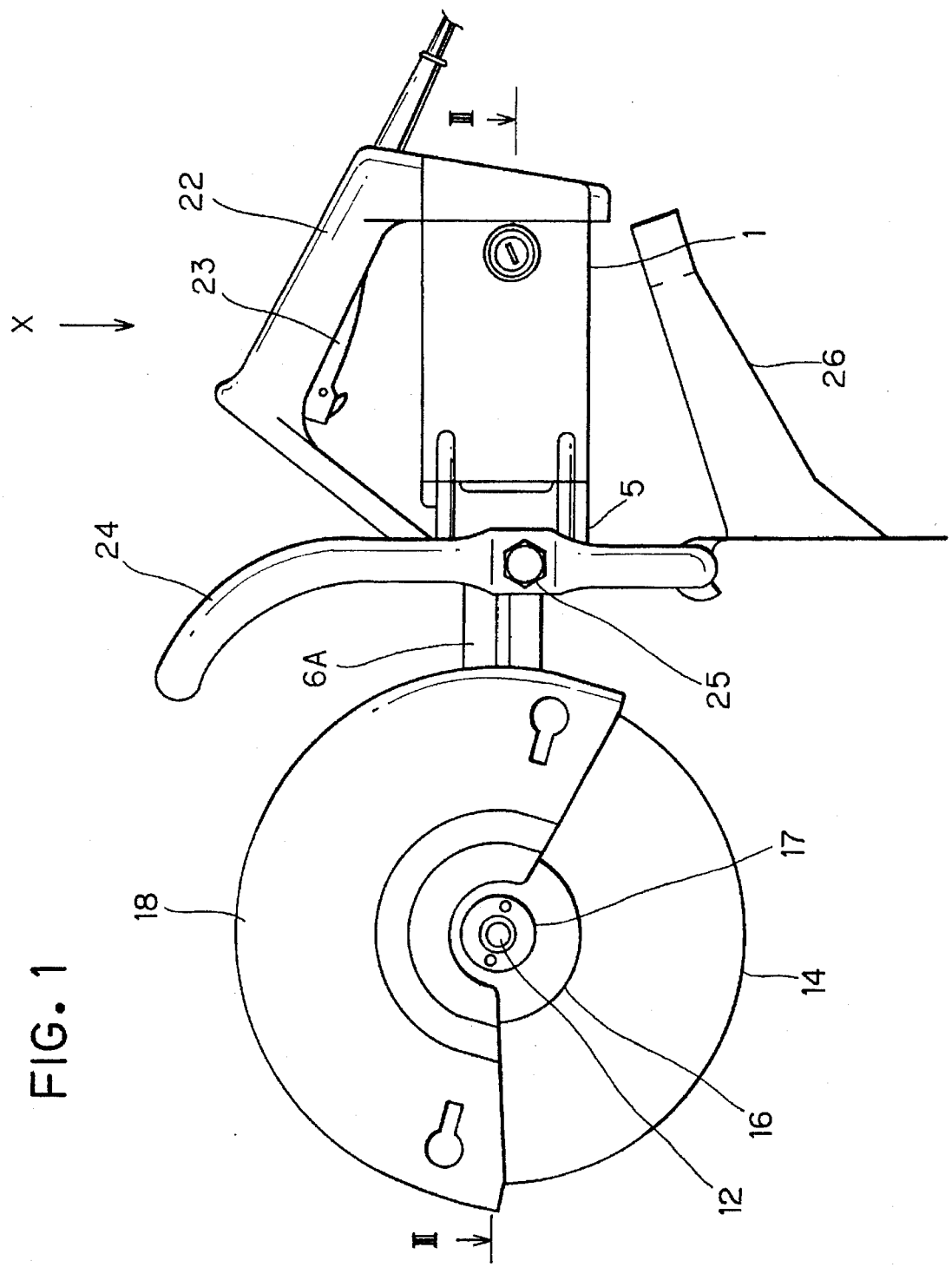
FIG. 1 is a side view showing an electric-powered stone cutter according to a first embodiment of the present invention.

As best shown in FIG. 1, a handle 22 is mounted to the main body 1, and a power switch 23 is provided housed in the handle 22. A major gripping portion of the handle 22 extends in parallel with the axis of the motor shaft. That is, the handle 22 is aligned with the axis of the motor shaft without any offsetting when viewed from the direction indicated by an arrow X in FIG. 1. In other words, when the stone cutter is oriented in a posture shown in FIG. 1, the bit 14, the axis of the motor shaft and the handle 22 are in an identical vertical plane.

Figure 2:
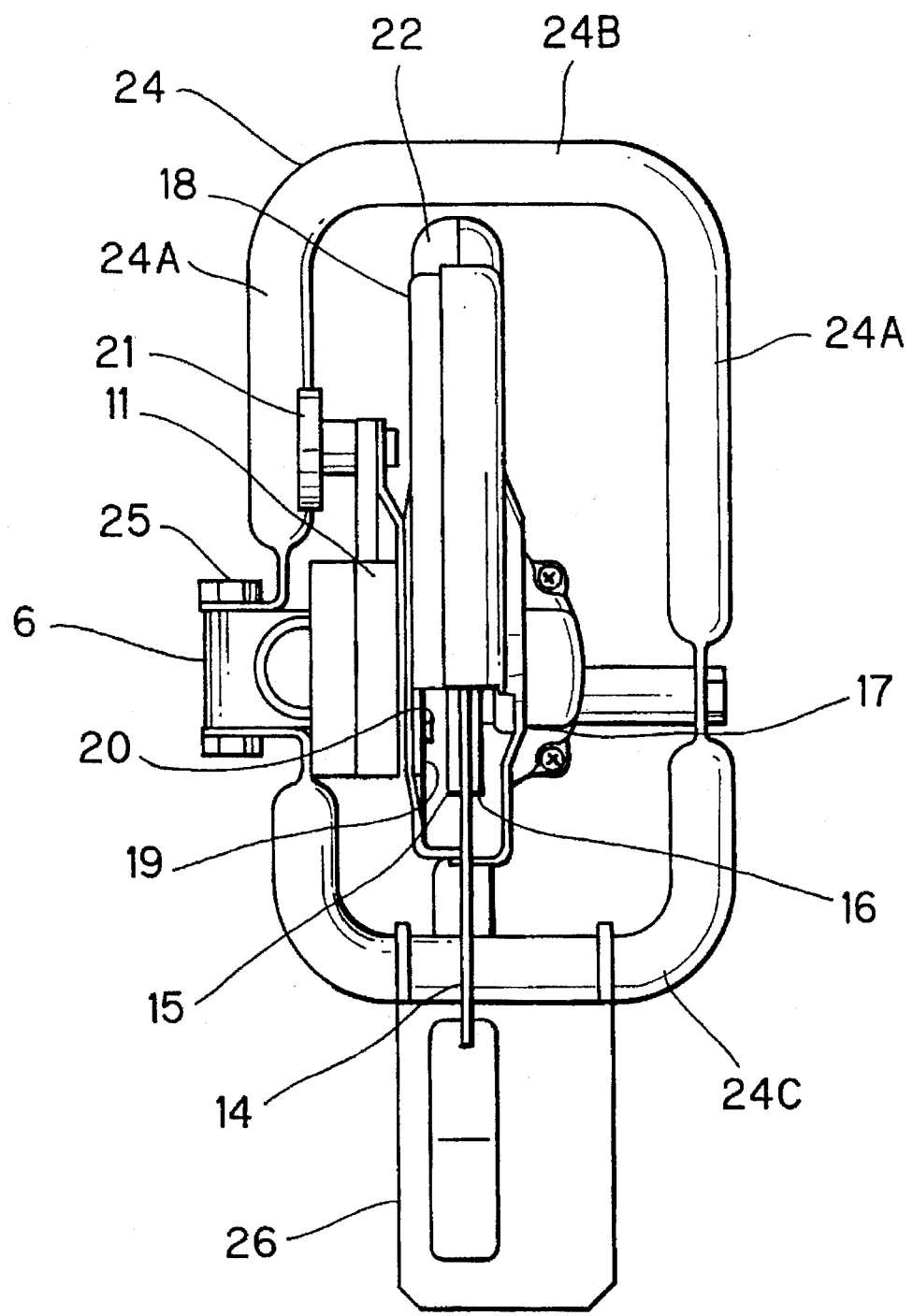
FIG. 2 is a bottom view of the stone cutter according to the first embodiment.

A secondary handle 24 is mounted on the gear cover 6 by a bolt 25. The secondary handle 24 is provided so as to straddle the width of the main body 1. That is, as best shown in FIG. 2, the second handle 24 has a vertical arm portions 24A, 24A positioned laterally aside the gear cover 6, an upper grip portion 24B bridging between upper ends of the vertical arm portions 24A, 24A, and a lower extension portion 24C bridging between lower ends of the arm portions 24A, 24A. The upper grip portion 24B is positioned above the axis of the motor 4, so that the gripping area on the upper grip portion 24B can be also on the above described vertical plane. A collection hood 26 for collecting debris generated during cutting is rotatably mounted to the lower extension 24C of the secondary handle 24 below the underside of the main body 1. The hood 26 is formed of a resilient material.

Figure 4:
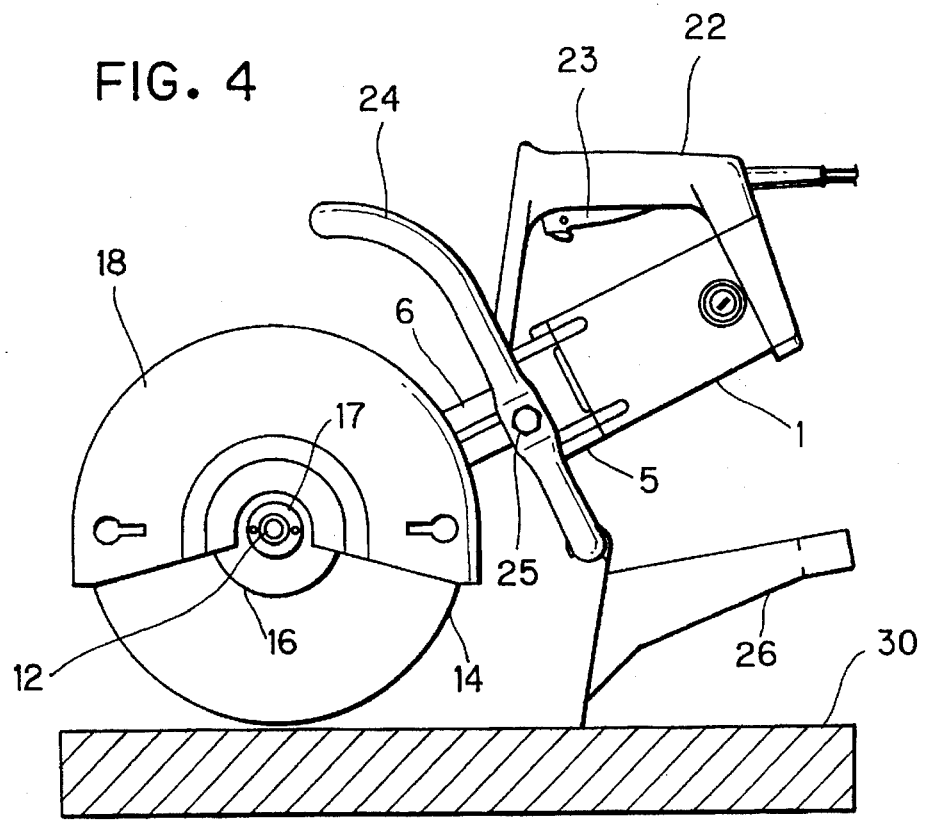
FIG. 4 is a schematic side view showing a cutting operation state of the stone cutter provided with a dust collection hood according to the first embodiment of the present invention.

Next, an operation for cutting a workpiece 30 such as stone, concrete, or asphalt will be described while referring to FIG. 4. The operator pulls the switch 23 while holding the handle 22 so that the motor 4 starts. Rotation of the motor 4 is transmitted to the bit 14 via the three transmission gears 7A, 7B, and 7C, the connection rod 9, the two bevel gears 10 and 13, and the spindle 12. The operator then abuts the bit 14 against the workpiece 30 and moves the main body 1 back and forth across the workpiece 30. Because the hood 26 is positioned in the path of flying dust, stone dust produced when the workpiece 30 is cut is collected in the hood 26.

In the present embodiment, the spindle 12 is positioned at right angles to the axis of the motor 4. Also, the bit 14, the handle 22 and the axis of the motor 4 are all positioned in the identical plane. Therefore, the distance between the bit 14 and the operator can be reduced and the overall width of the cutter can be greatly reduced, thereby facilitating operation. For example, the cutting line is easier to see, and cutting can be accurately performed. In other words, the width of the overall cutter is greatly narrowed so that operability is improved.

Further, since the bit 14, the handle 22 and the axis of the motor 4 are all positioned in the identical plane, if the stone cutter is operated under the vertically oriented posture (if the plane extends in the vertical direction), inclination of the stone cutter is avoidable during the cutting operation. Moreover, if the bit 14 is the rotated at high speed, rotation axis may not be kinetically easily deviated. Thus, inclination of the stone cutter is avoidable during operation, thereby enhancing operability and cutting accuracy.

Furthermore, rapid increases in load, caused, for example, when the bit 14 begins to cut into an especially hard region of the workpiece 30, will not cause the RPM of the motor 4 to decrease, because the connection rod 9 receives and absorbs such loads by twisting and because of the inertial force of the flywheel 2 attached to the shaft of the motor 4. Therefore, smooth cutting operations can be provided. In other words, fluctuations in the load or rapid application of load produce only small fluctuations in the RPM of the motor because of the distortion of the connection rod 9. Therefore, damage to the transmission gears 7A–7C is prevented and cutting operations are not interrupted.

Furthermore, because the grip of the secondary handle 24 is positioned across the cutting bit plane in which an axis of the motor shaft is positioned, the stone cutter will not sway sideways, and can cut straight and vertically into the workpiece 30.

A power stone cutter according to a second embodiment of the present invention will next be described with reference to FIGS. 5 through 13 wherein like parts and components are designated by the same reference numerals as those shown in FIGS. 1 through 4 to avoid duplicating description.

Although the first preferred embodiment has the above-described advantages, there still exists technically unsolved matters. For example, a cutter according to first preferred embodiment is only able to cut the workpiece 30 when the cutting plane is coincident with the above described vertical plane. Furthermore, cutting through an upright structure along a line parallel with ground is almost impossible in the first embodiment. It is desirable that cutting be possible in any direction.

Still further, the cutter in the first embodiment is fabricated so that the bit 14 either faces downwards or upwards. That is, the bit 14 can cut the workpiece 30 by either downward rotation or upward rotation. Therefore, two different cutters are required, one for cutting upwards and another for cutting downwards. It is desirable to have a cutter which can cut both upwards and downwards.

Furthermore, if the cutter is modified so that the cutting plane can be changed or the rotating direction of the bit 14 can be changed, the dust collecting position should also changed be changeable. If it is not, the dust collection hood 26 will be ineffectual for collecting dust. Therefore, another method must be considered. A cutter according to the second embodiment is provided in consideration of the above technical issues.

Figure 5:
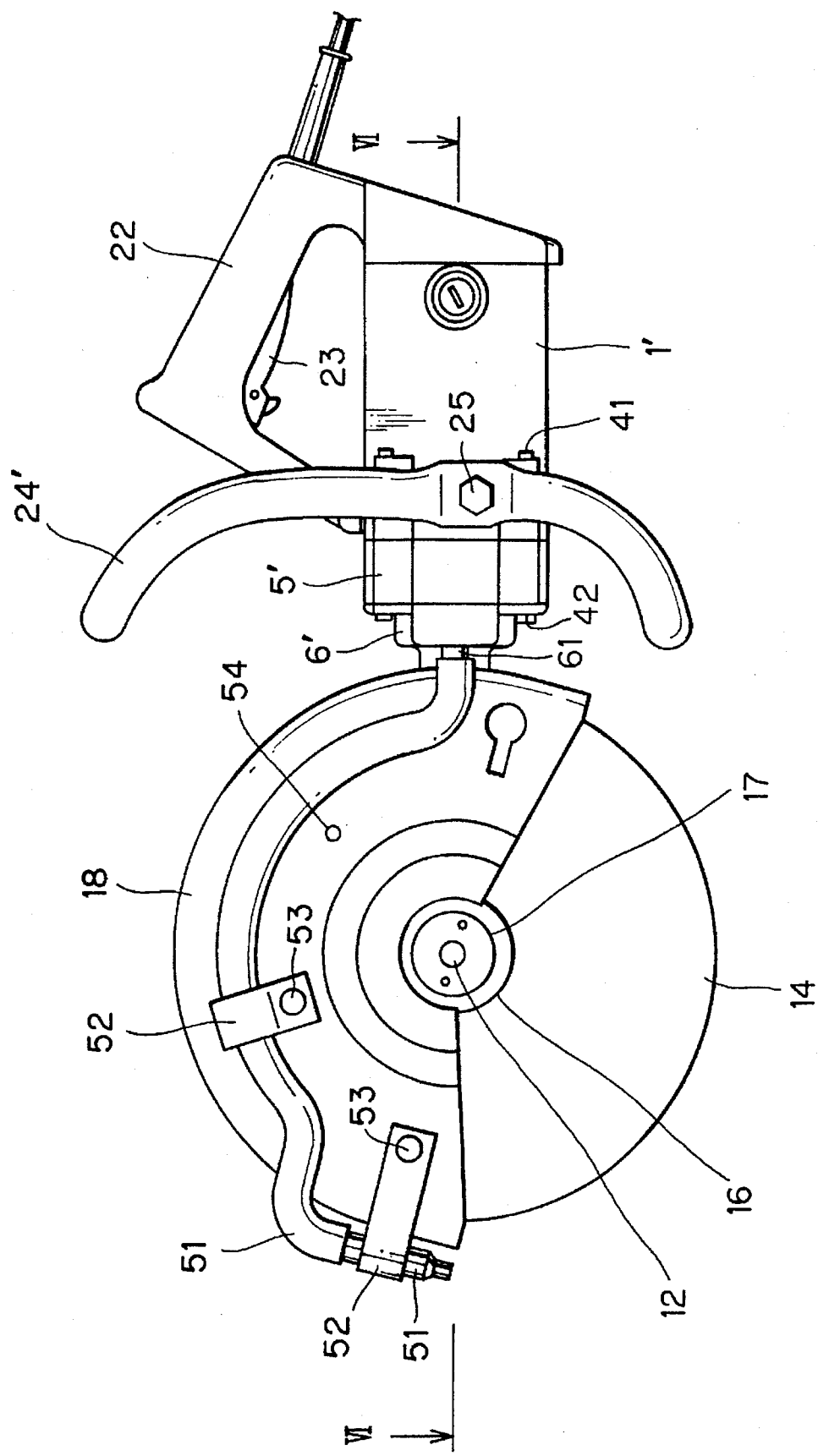
FIG. 5 is a side view showing an electric-powered stone cutter according to a second embodiment of the present invention.
Figure 6:
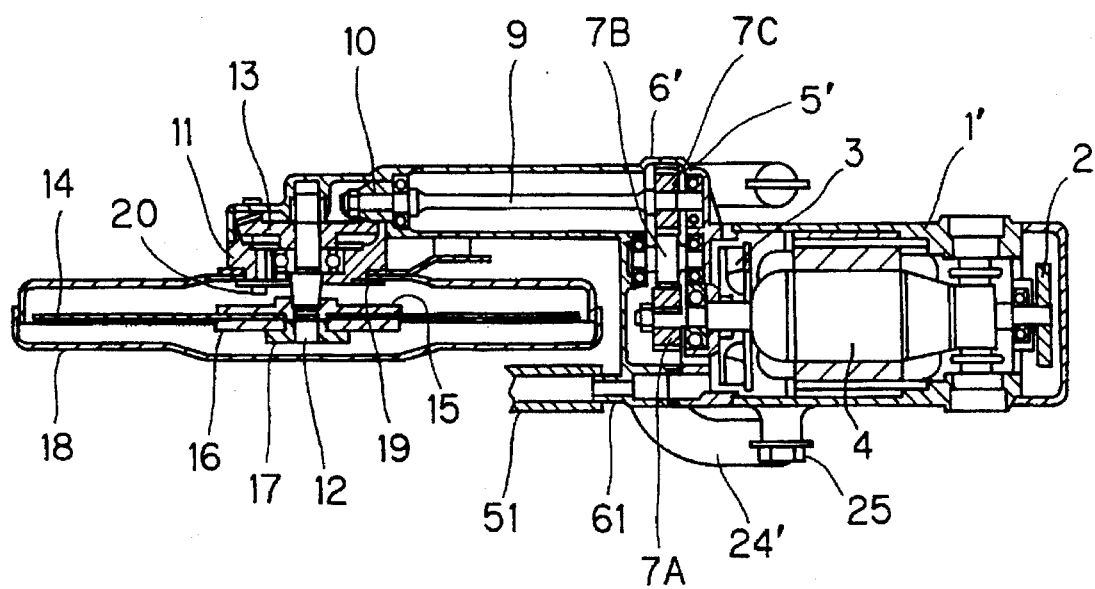
FIG. 6 is a cross-sectional view taken along the line VI—VI in FIG. 5.
Figure 7:
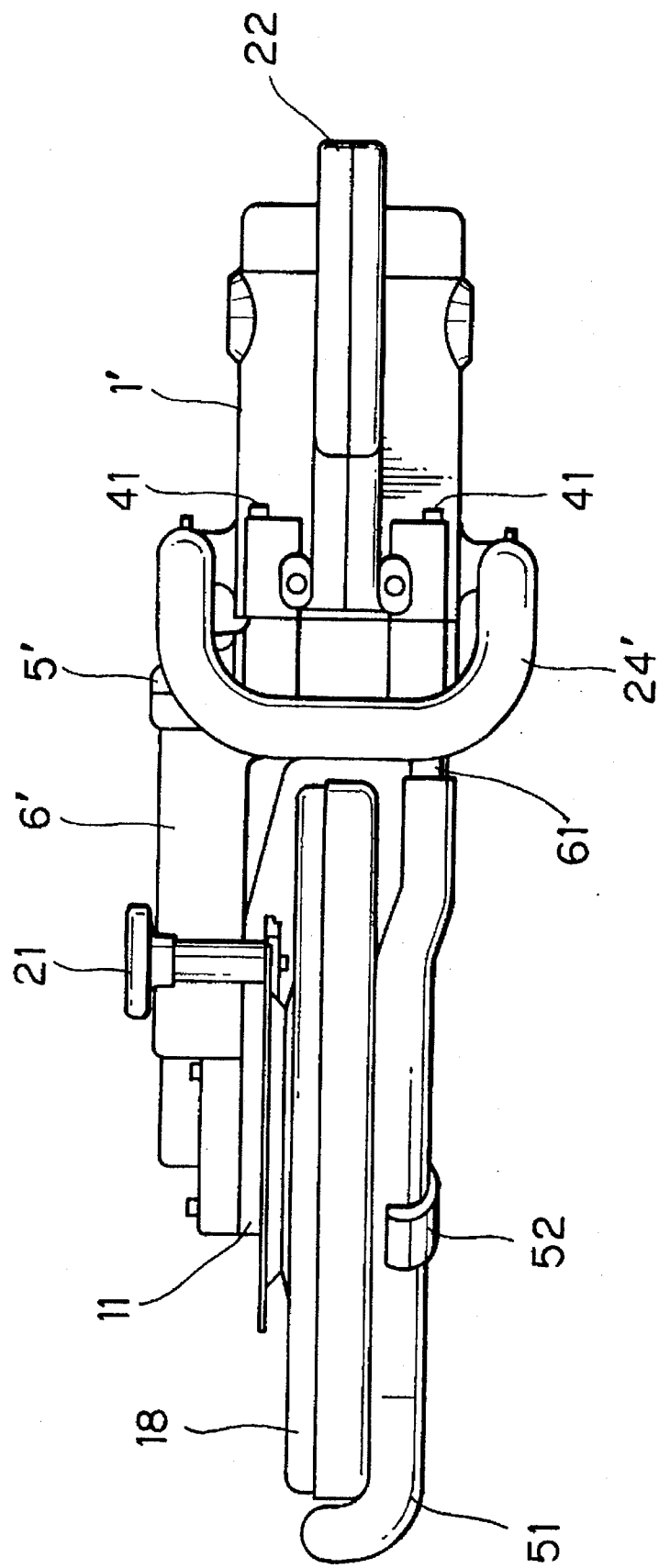
FIG. 7 is a plan view showing the stone cutter according to the second embodiment.
Figure 8:
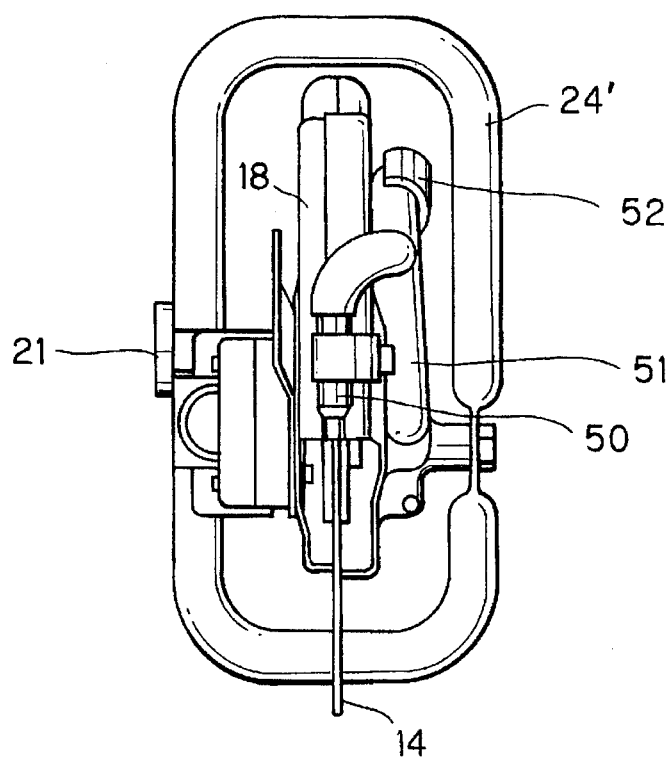
FIG. 8 is a front view showing the stone cuter according to the second embodiment.
Figure 10:
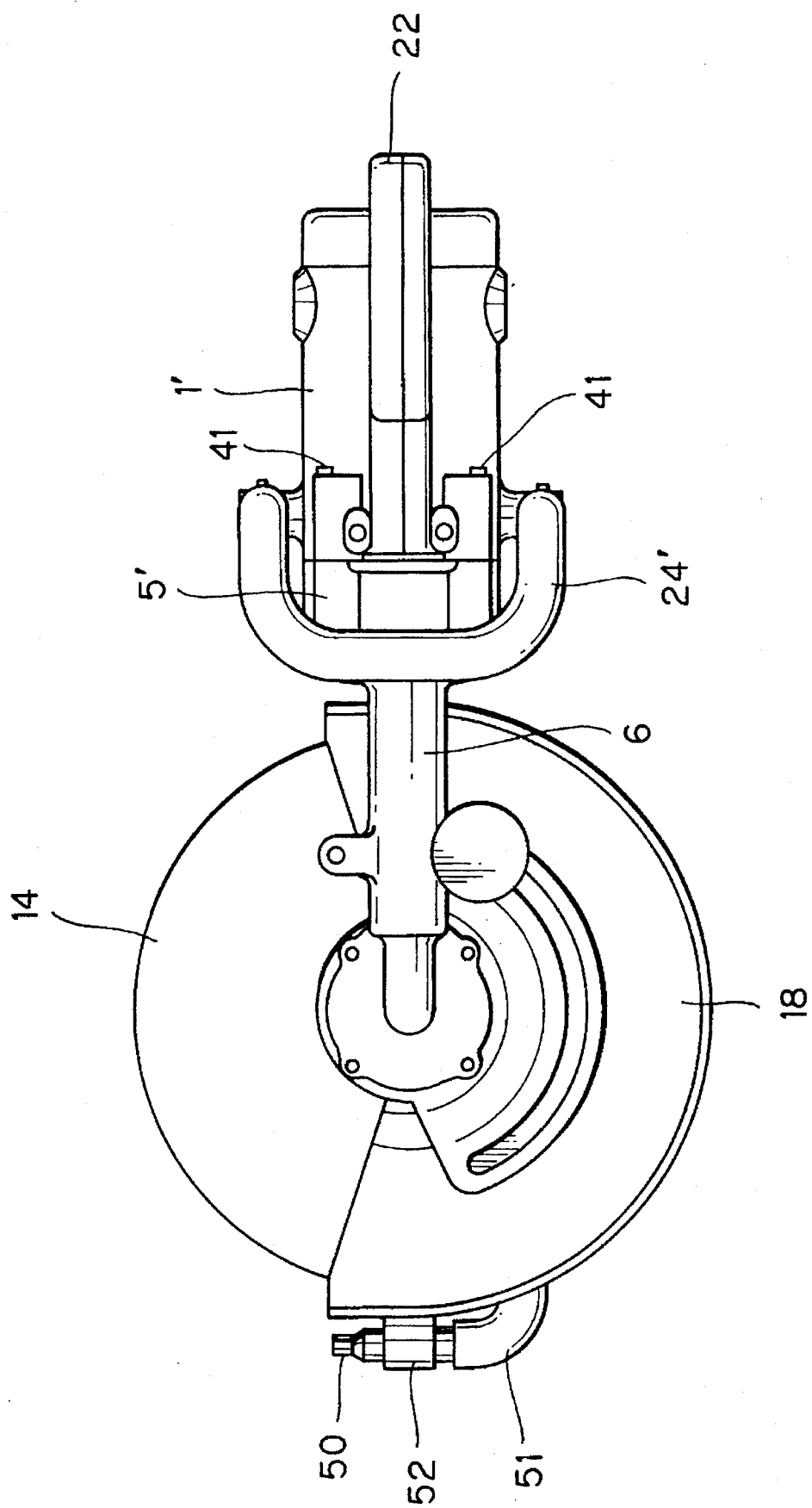
FIG. 10 is a plan view showing the stone cutter in which a gear cover and a disk bit are turned by 90 degrees with respect to a main body from the state shown in FIG. 7.
Figure 13:
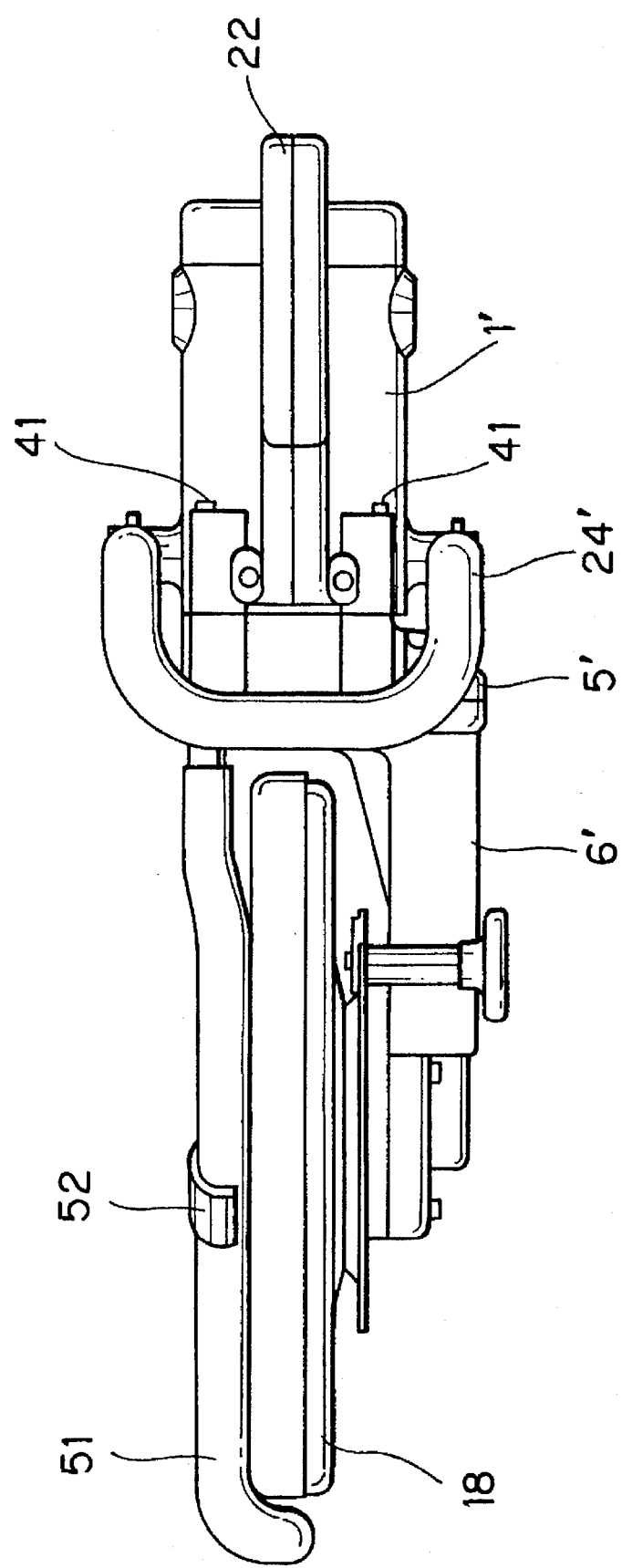
FIG. 13 is a plan view showing the stone cutter in which the gear cover and the disk bit are turned by 180 degrees with respect to the main body from the state shown in FIG. 7.

A stone cutter according to the second preferred embodiment includes a main body 1', an inner cover 5', and a gear cover 6'. The main body 1' is provided with a plurality of boss portions at regular intervals centered around the axis of the motor 4. A hole is provided through each boss. Four bosses are provided and spaced 90 degrees apart from each other thereby providing four holes. Further, screw holes are provided in the inner cover 5' at positions corresponding to the positions of the holes in the main body 1'. A plurality of lock screws 41 extend through the holes of the main body 1 and are threadingly engaged with the screw holes of the inner cover 5' for detachably fixing the inner cover 5' to the main body 1'. In this way, the position at which the inner cover 5' is attached to the main body 1' can be changed as shown in FIGS. 5, 10, and 13. The gear cover 6' is fastened to the inner cover 5' by lock screws 42. Thus, the gear cover 6' is fixed to the main body 1' through the inner cover 5'. Further, a secondary handle 24' is secured to the main body 1' by a bolts 25.

The second embodiment does not provide the dust collection hood 26 of the first embodiment, but provides a dust blowing arrangement. That is, a blow port 61 protrudes from the gear cover 6' for discharging air current that is produced by the fan 3. A hose 51 made from a stretchable material is connected at one end to the blow port 61. The bit guard 18 is formed with a plurality of locking holes 54. A clip 52 for supporting the hose 51 to the bit guard 18 is detachably secured to the bit guard 18 by a lock screw 53 detachably engageable with one of the locking holes 54. The other end of the hose 51 is connectable to a nozzle 50 detachably supported to the bit guard 18 by another clip 52 and another lock screw 53. With this arrangement, the nozzle 50 can be attached to a desired position of the bit guard 18.

Next, an operation for changing the posture of the bit 14 in the second embodiment will be described. First, the lock screws 41 are loosened so that the inner cover 5' along with the gear cover 6' can be detached from the main body 1'. After being detached, the inner cover 5' and the gear cover 6' are rotated with respect to the main body 1' around the axis of the motor 4 until the bit 14 is in the desired posture. Screw holes in the inner cover 5' are aligned with the holes in the main body 1' and the lock screws 41 are retightened.

Figure 9:
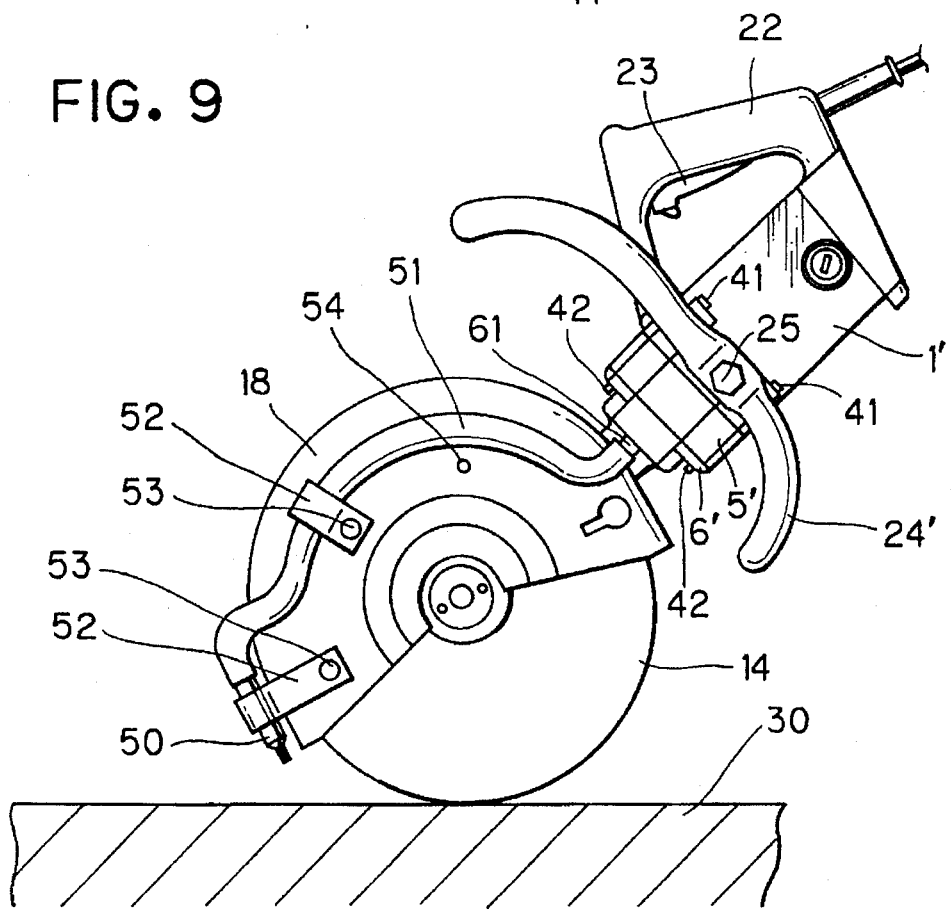
FIG. 9 is a schematic side view showing cutting operation phase according to the second embodiment.

The posture of the bit 14 can therefore be changed to postures shown in FIGS. 5, FIG. 10 and FIG. 13. When the bit 14 is in the posture shown in FIGS. 5 through 8, the stone cutter can be used to cut downward as shown in FIG. 9 similar to the first embodiment. When the bit 14 is in the posture shown in FIG. 10, cutting in a direction parallel with the ground is possible, while the handle 22 extends in the vertical plane. Further, when the bit 14 is in the posture shown in FIG. 13, the stone cutter can be used to cut upward. Therefore, the stone cutter can be selectively used to cut upward or downward. Incidentally, FIG. 13 shows the bit guard 18 adjusted so that the lower half portion of the bit 14 is exposed.

Figure 11:
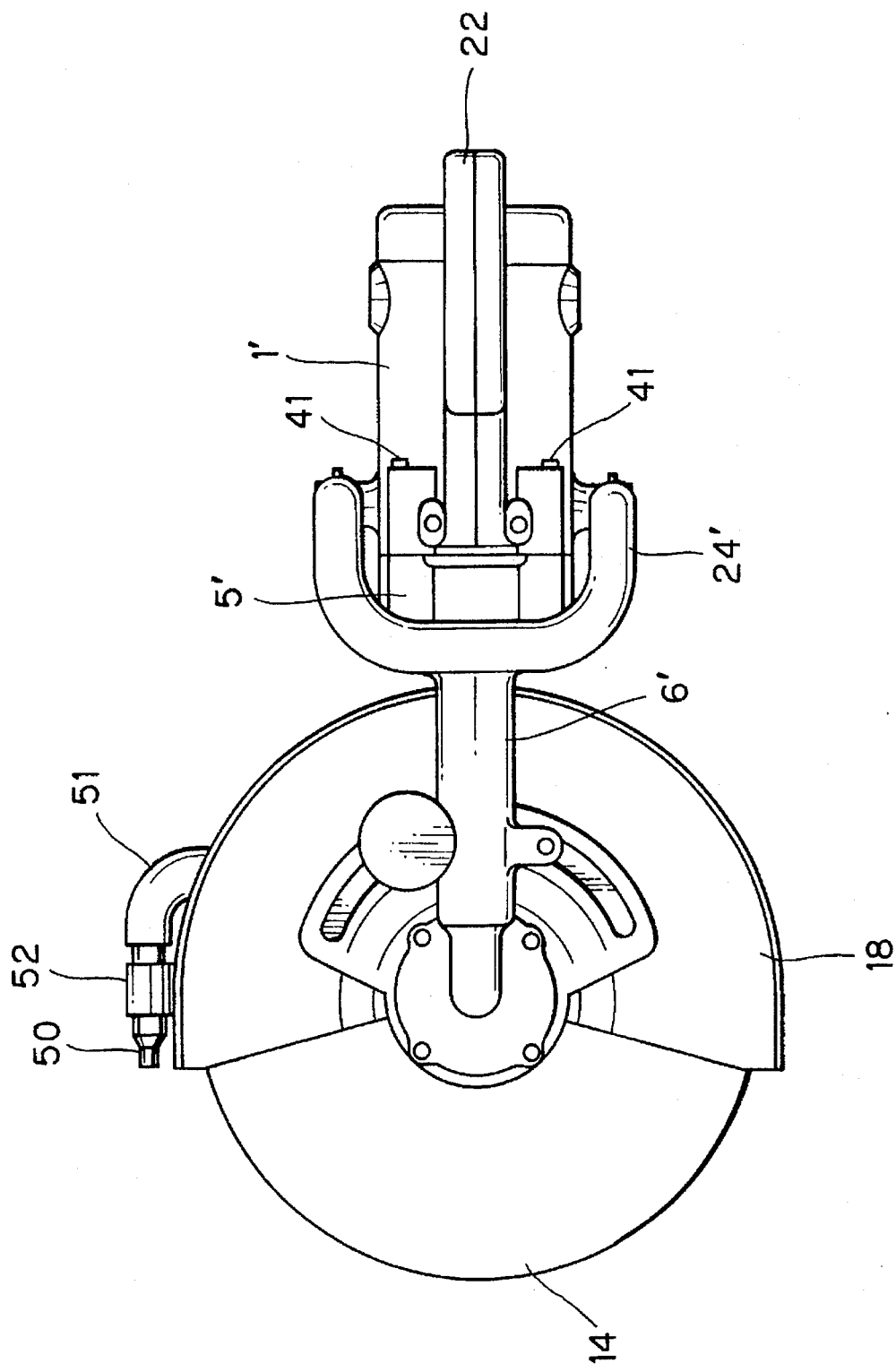
FIG. 11 is a plan view showing the stone cutter in which the positional relationship between the main body and the disk bit is maintained unchanged from the state shown in FIG. 10, but a bit guard is angularly moved by 90 degrees from the state shown in FIG. 10.
Figure 12:
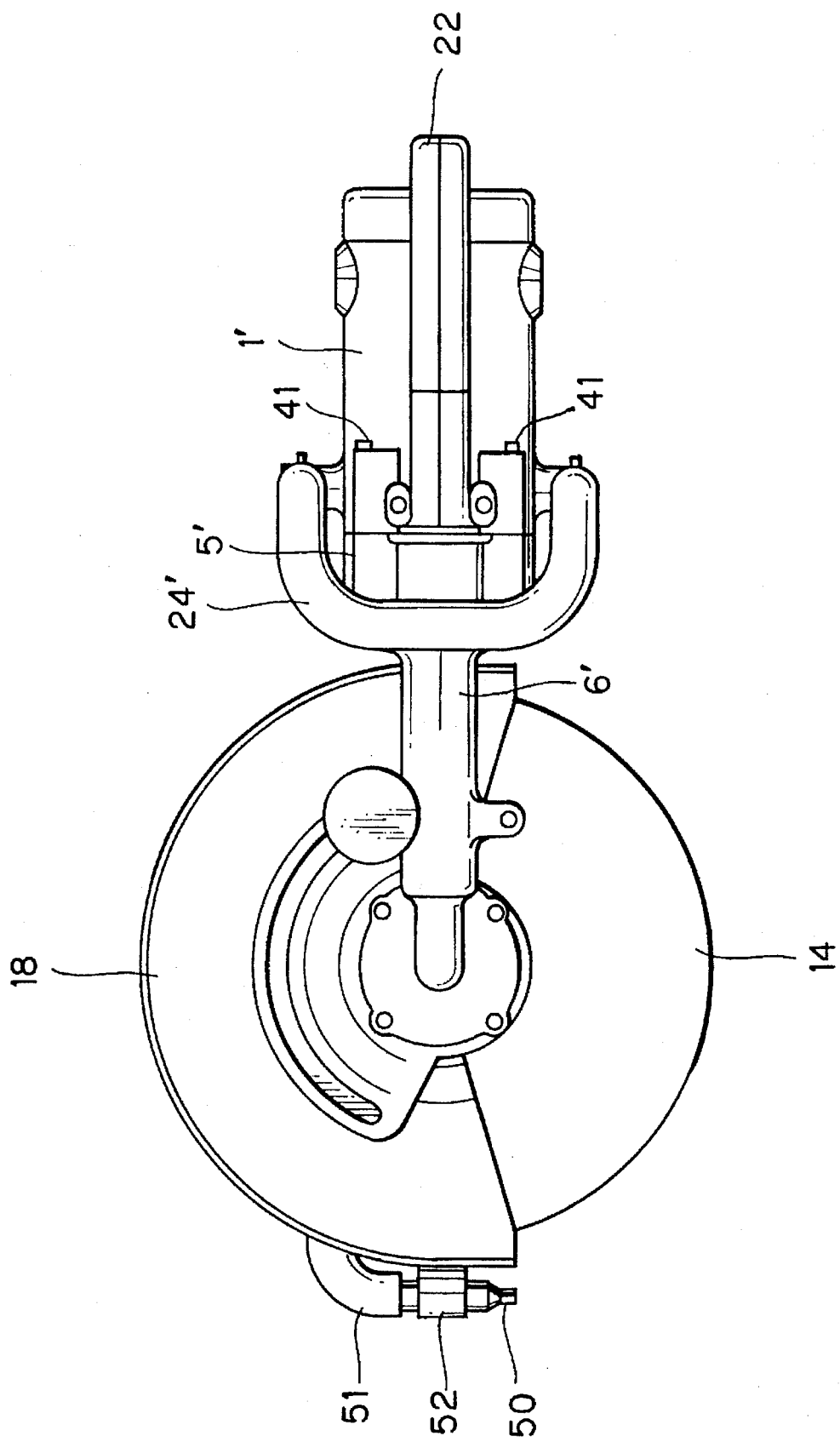
FIG. 12 is a plan view showing the stone cutter in which the positional relationship between the main body and the disk bit is maintained unchanged from the state shown in FIGS. 10 and 11, but a bit guard is further angularly moved by 90 degrees from the state shown in FIG. 11.

FIGS. 11 and 12 show the posture of the bit 14 the same as that shown in FIG. 10. However, the angular position of the bit guard 18 is changed for providing optimum cutting operation. In accordance with the change in the angular position of the bit guard 18, the attaching position of the nozzle 50 is also changed. In this way, the bit 14 can be exposed in the manner that best facilitates cutting. When the motor 4 is energized, the discharged air current passes through the inner cover 5', the gear cover 6', the hose 51, and the nozzle 50 so as to blow on the area being cut, thereby blowing away stone dust generated when the workpiece 30 is cut. As shown in FIGS. 10 through 13, the nozzle 50 is always near the area being cut even when the position of the bit guard 18 is changed. Therefore, stone dust is blown away from the area being cut regardless of the direction at which the bit 14 cuts into the workpiece 30. This allows accurate cutting following the cut line. Because the hose 51 is made from a stretchable material, the hose 51 can easily follow movements of the bit guard 18. A workpiece 30 can be cut from any direction using a stone cutter according to the second preferred embodiment. Cutting upward and cutting downward is also possible. The nozzle 50 and the hose 51 mounted to the bit guard 18 allows blowing stone dust away from the area where the bit 14 cuts into the workpiece 30. A power cutter according to the second preferred invention can be inexpensively produced.

While the invention has been described in detail with reference to specific embodiments thereof, it would be apparent to those skilled in the art that various changes and modifications may be made therein without departing from the spirit and scope of the invention.

What is claimed is:

1. A power stone cutter including: an electric motor having a motor shaft which provides an axis; a main body for housing the electric motor; a handle mounted to the main body; a bit supported by the main body and rotatable by the electric motor for cutting a workpiece, and the improvement comprising;

a plurality of transmission gears provided at right angles to the axis of the motor shaft for transmitting rotation of the electric motor;

a flywheel mounted to the motor shaft on a side of the motor opposite to the transmission gears;

a connection rod extending in parallel with the motor shaft and having one end coupled with one of the transmission gears and having another end;

a first bevel gear fixed to the other end of the connection rod;

a second bevel gear in meshing engagement with the first bevel gear; and a spindle fixed to the second bevel gear and extending in a direction perpendicular to the motor shaft, the bit being mounted to the spindle, the handle and the bit being in a plane which contains the axis of the motor shaft.

2. A power stone cutter including: an electric motor having a motor shaft which provides an axis; a main body for housing the electric motor; a handle mounted to the main body; a bit supported by the main body and rotatable by the electric motor for cutting a workpiece, and the improvement comprising;

a plurality of transmission gears provided at right angles to the axis of the motor shaft for transmitting rotation of the electric motor;

a connection rod extending in parallel with the motor shaft and having one end coupled with one of the transmission gears and having another end, the connection rod including means for allowing distortion of the connection rod to absorb rapid increases in load;

a first bevel gear fixed to the other end of the connection rod;

a second bevel gear in meshing engagement with the first bevel gear; and a spindle fixed to the second bevel gear and extending in a direction perpendicular to the motor shaft, the bit being mounted to the spindle, the handle and the bit being in a plane which contains the axis of the motor shaft.

3. The power stone cutter as claimed in claim 2, wherein the means for allowing distortion of the connection rod comprises an intermediate portion of the connection rod having a diameter smaller than that of the end portions thereof.

4. The power stone cutter as claimed in claim 1, further comprising a secondary handle having a grip portion and mounted to the main body, the grip portion being positioned across the plane which contains the handle and the axis of the motor shaft.

5. A power stone cutter including: an electric motor having a motor shaft which provides an axis; a main body for housing the electric motor; a handle mounted to the main body; a bit supported by the main body and rotatable by the electric motor for cutting a workpiece, and the improvement comprising;

a plurality of transmission gears provided at right angles to the axis of the motor shaft for transmitting rotation of the electric motor;

a connection rod extending in parallel with the motor shaft and having one end coupled with one of the transmission gears and having another end;

a first bevel gear fixed to the other end of the connection rod;

a second bevel gear in meshing engagement with the first bevel gear; and a spindle fixed to the second bevel gear and extending in a direction perpendicular to the motor shaft, the bit being mounted to the spindle, the handle and the bit being in a plane which contains the axis of the motor shaft;

a secondary handle having a grip portion and mounted to the main body, the grip portion being positioned across the plane which contains the handle and the axis of the motor shaft;

a hood rotatably attached to the secondary handle at a position opposite the grip portion with respect to the main body for collecting stone dust generated at the workpiece being cut by the bit.

6. The power stone cutter as claimed in claim 1, wherein the connection rod has an intermediate portion having a diameter smaller than that of end portions thereof for allowing distortion of the connection rod.

7. The power stone cutter as claimed in claim 6, further comprising a secondary handle having a grip portion and mounted to the main body, the grip portion being positioned across the plane which contains the handle and the axis of the motor shaft.

8. A power stone cutter including: an electric motor having a motor shaft which provides an axis; a main body for housing the electric motor; a handle mounted to the main body; a bit supported by the main body and rotatable by the electric motor for cutting a workpiece, and the improvement comprising;

a flywheel mounted to the motor shaft;

a plurality of transmission gears provided at right angles to the axis of the motor shaft for transmitting rotation of the electric motor;

a connection rod extending in parallel with the motor shaft and having one end coupled with one of the transmission gears and having another end, wherein the connection rod has an intermediate portion having a diameter smaller than that of end portions thereof for allowing distortion of the connection rod;

a first bevel gear fixed to the other end of the connection rod;

a second bevel gear in meshing engagement with the first bevel gear; and a spindle fixed to the second bevel gear and extending in a direction perpendicular to the motor shaft, the bit being mounted to the spindle, the handle and the bit being in a plane which contains the axis of the motor shaft;

a secondary handle having a grip portion and mounted to the main body, the grip portion being positioned across the plane which contains the handle and the axis of the motor shaft; and a hood rotatably attached to the secondary handle at a position opposite the grip portion with respect to the main body for collecting stone dust generated at the workpiece being cut by the bit.

9. The power stone cutter as claimed in claim 1, further comprising a gear cover for housing the spindle, the first bevel gear, the second bevel gear, and the connection rod, the gear cover being detachably attached to the main body.

10. A power stone cutter including: an electric motor having a motor shaft which provides an axis; a main body for housing the electric motor; a handle mounted to the main body; a bit supported by the main body and rotatable by the electric motor for cutting a workpiece, and the improvement comprising;

a plurality of transmission gears provided at right angles to the axis of the motor shaft for transmitting rotation of the electric motor;

a connection rod extending in parallel with the motor shaft and having one end coupled with one of the transmission gears and having another end;

a first bevel gear fixed to the other end of the connection rod;

a second bevel gear in meshing engagement with the first bevel gear; and a spindle fixed to the second bevel gear and extending in a direction perpendicular to the motor shaft, the bit being mounted to the spindle, the handle and the bit being in a plane which contains the axis of the motor shaft;

a gear cover for housing the spindle, the first bevel gear, the second bevel gear, and the connection rod, the gear cover being detachably attached to the main body;

means for changing angular position of the gear cover with respect to the main body for changing a posture of the bit relative to the main body and the handle.

11. The power stone cutter as claimed in claim 10, wherein the changing means comprises;

an inner cover disposed between the main body and the gear cover, the inner cover being formed with a plurality of screw holes spaced equi-distantly from each other and at diametrically opposite positions; and a plurality of screws detachably engageable with the the main body, the screws being threadingly engageable with the plurality of screw holes, the gear cover being fixed to the inner cover.

12. The power stone cutter as claimed in claim 11, further comprising a bit guard angularly movably and position-fixably supported by the gear cover for covering a part of the bit.

13. The power stone cutter as claimed in claim 12 further comprising a fan mounted to the motor shaft for generating a cooling flow of air to cool the electric motor.

14. The power stone cutter as claimed in claim 13 further comprising:

a blow hole portion provided in the gear cover for discharging from the main body the cooling flow of air;

a flexible hose having one open end attached to the blow hole portion and having another open end and a nozzle member connected to the other open end of the hose and detachably supported by the bit guard for blowing the cooling flow of air toward a cutting area of the workpiece being cut by the bit.

15. The power stone cutter as claimed in claim 3, further comprising a gear cover for housing the spindle, the first bevel gear, the second bevel gear, and the connection rod, the gear cover being detachably attached to the main body.

16. A power stone cutter including: an electric motor having a motor shaft which provides an axis; a main body for housing the electric motor; a handle mounted to the main body; a bit supported by the main body and rotatable by the electric motor for cutting a workpiece, and the improvement comprising;

a plurality of transmission gears provided at right angles to the axis of the motor shaft for transmitting rotation of the electric motor;

a connection rod extending in parallel with the motor shaft and having one end coupled with one of the transmission gears and having another end, wherein the connection rod has an intermediate portion having a diameter smaller than that of end portions thereof for allowing distortion of the connection rod;

a first bevel gear fixed to the other end of the connection rod;

a second bevel gear in meshing engagement with the first bevel gear; and a spindle fixed to the second bevel gear and extending in a direction perpendicular to the motor shaft, the bit being mounted to the spindle, the handle and the bit being in a plane which contains the axis of the motor shaft;

a gear cover for housing the spindle, the first bevel gear, the second bevel gear, and the connection rod, the gear cover being detachably attached to the main body; and means for changing angular position of the gear cover with respect to the main body for changing a posture of the bit relative to the main body and the handle.

17. The power stone cutter as claimed in claim 16, wherein the changing means comprises;

an inner cover disposed between the main body and the gear cover, the inner cover being formed with a plurality of screw holes spaced equi-distantly from each other and at diametrically opposite positions; and a plurality of screws detachably engageable with the main body, the screws being threadingly engageable with the plurality of screw holes, the gear cover being fixed to the inner cover.

18. The power stone cutter as claimed in claim 17, further comprising a bit guard angularly movably and position-fixably supported by the gear cover for covering a part of the bit.

19. The power stone cutter as claimed in claim 18 further comprising a fan mounted to the motor shaft for generating a cooling flow of air to cool the electric motor.

20. The power stone cutter as claimed in claim 19 further comprising:

a blow hole portion provided in the gear cover for discharging from the main body the cooling flow of air;

a flexible hose having one open end attached to the blow hole portion and having another open end and a nozzle member connected to the other open end of the hose and detachably supported by the bit guard for blowing the cooling flow of air toward a cutting area of the workpiece being cut by the bit.

\* \* \* \* \*